United States Patent
Puthenveettil

(10) Patent No.: US 9,632,692 B2
(45) Date of Patent: Apr. 25, 2017

(54) METHOD AND SYSTEM TO IMPLEMENT A QUASI-USER INTERFACE FOR APPLICATIONS ON AN ELECTRONIC DEVICE

(71) Applicant: Samsung Electronics Co., Ltd., Gyeonggi-do (KR)

(72) Inventor: Dipin Kollencheri Puthenveettil, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 252 days.

(21) Appl. No.: 14/335,694

(22) Filed: Jul. 18, 2014

(65) Prior Publication Data
US 2015/0058760 A1    Feb. 26, 2015

(30) Foreign Application Priority Data
Aug. 26, 2013 (IN) .......................... 3753/CHE/2013

(51) Int. Cl.
| G06F 3/0488 | (2013.01) |
| G06F 3/0481 | (2013.01) |
| G06F 3/0482 | (2013.01) |

(52) U.S. Cl.
CPC .......... *G06F 3/0488* (2013.01); *G06F 3/0481* (2013.01); *G06F 3/0482* (2013.01); *G06F 3/04883* (2013.01); *G06F 2203/04108* (2013.01)

(58) Field of Classification Search
CPC ... G06F 3/0481; G06F 3/0482; G06F 3/04883
See application file for complete search history.

(56) References Cited

U.S. PATENT DOCUMENTS

| 7,346,855 B2 | 3/2008 | Hellyar et al. | |
| 7,930,447 B2 | 4/2011 | Best et al. | |
| 2003/0117440 A1* | 6/2003 | Hellyar | G06F 3/0235 715/767 |
| 2006/0161871 A1* | 7/2006 | Hotelling | G06F 3/0485 715/863 |
| 2012/0216146 A1 | 8/2012 | Korkonen | |
| 2012/0311494 A1 | 12/2012 | Laden et al. | |
| 2014/0137020 A1* | 5/2014 | Sharma | G06F 3/0486 715/769 |

FOREIGN PATENT DOCUMENTS

EP       1 936 483 A1    6/2008

* cited by examiner

*Primary Examiner* — Aaron Lowenberger

(57) ABSTRACT

A method and system to implement a quasi-user interface to manage application state transitions by activating quasi-states on an electronic device is disclosed. The method allows a user to maintain the activated quasi-states for an application for the duration determined by the presence of an object within the proximity on the electronic device. The quasi-state activated applications can be switched between a quasi-state and a non-quasi-state supported on the electronic device. Further, the method deactivates the quasi-states and the quasi-user interface when the object is lifted away from the proximity of the electronic device.

9 Claims, 8 Drawing Sheets

METHOD AND SYSTEM TO IMPLEMENT A QUASI-USER INTERFACE FOR APPLICATIONS ON AN ELECTRONIC DEVICE

PRIORITY

The present application is related to and claims the benefit under 35 U.S.C. §119(a) of a Korean patent application filed on Aug. 26, 2013 in the Indian Intellectual Property Office and assigned Application No. 3753/CHE/2013, the entire disclosure of which is hereby incorporated by reference.

TECHNICAL FIELD

The present disclosure relates to implementing a quasi-user interface and more particularly relates to activating quasi-states for applications and managing the application state transitions supported on an electronic device.

BACKGROUND

In the current scenario, an electronic device supports numerous applications on various hardware configurations. Usage of these applications requires configuring and connecting the hardware components as required for performing any activity. Additionally, applications supported on the electronic device is arranged and depicted on a graphical user interface in different ways. These applications can be accessed by using various keystrokes, combination of keystrokes, gestures and so on.

In one of the existing method, navigation to different applications requires various keystrokes and clicks to be performed on the user interface of the electronic device. Further, usage of these keystrokes and clicks are specific to handheld devices. This limits the scope of navigation to different applications on the electronic device.

In another existing method, detecting and monitoring application status requires various hardware setups. Specific logic configuration and circuits are to be used for using the applications supported on the hardware. Since logic configuration and circuits of hardware is a time-consuming and cumbersome activity for the user, accessing applications on such device gets complicated.

In another existing method, the available applications and the active applications on the electronic device are arranged according to a hierarchy, and the hierarchy is determined by considering one of the following factor related to the application: frequency of use of the application, alphabetical order of the application, most recent use of the application, user-defined preference of the application, active state of the application, and a predictive model of the application. As determining the hierarchy of applications involves complex procedure and requires various steps, there is a need to provide an easier and faster method to access applications available on the device.

In another existing method, a transient user interface is used to select the application on a device. Based on the user's selection, the transient user interface is converted into a persistent user interface. The transient user interface supports the transient state for applications until the user sends a selection request to the application. This imposes a limit on the duration of the transient state and the transient user interface used for accessing the application.

SUMMARY

One of the objects of the disclosure herein is to provide a method and system to implement a quasi-user interface for applications available in an electronic device.

Another object of the disclosure is to provide a method to activate quasi-states for an application by performing a user-action within the proximity on the electronic device.

Another object of the disclosure is to maintain the activated quasi-states for an application for the duration as long as the user performs the interactions by keeping the object within the proximity on the electronic device.

Another object of the disclosure is to provide a method to deactivate quasi-states for an application on user lifting his finger away from the proximity on the electronic device.

Another object of the disclosure is to manage the state transitions of applications between the quasi-state and a non-quasi state.

To address the above-discussed deficiencies, it is a primary object to provide a method to implement a quasi-user interface for applications on an electronic device, wherein the method comprises activating a quasi-state for at least one application by performing a user-action on the electronic device. Further, the method maintains the quasi-state of at least one application in the quasi-state for a duration determined by presence of an object within proximity of the electronic device. Furthermore, the method deactivates the quasi-state of at least one application when a user lifts the object away from the proximity of the electronic device.

Accordingly the disclosure provides a computer program product to implement a quasi-user interface for applications on an electronic device, wherein the product comprises an integrated circuit. Further the integrated circuit comprises at least one processor and at least one memory. The memory comprises a computer program code within the integrated circuit. At least one memory and the computer program code with the at least one processor cause the product to activate the quasi-state for at least one application by performing a user-action on the electronic device. Further, the product is configured to maintain the quasi-state of at least one application to be in the quasi-state for a duration determined by the presence of an object within proximity of the electronic device. Furthermore, the product is configured to deactivate the quasi-state of at least one application when the user lifts the object away from the proximity of the electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
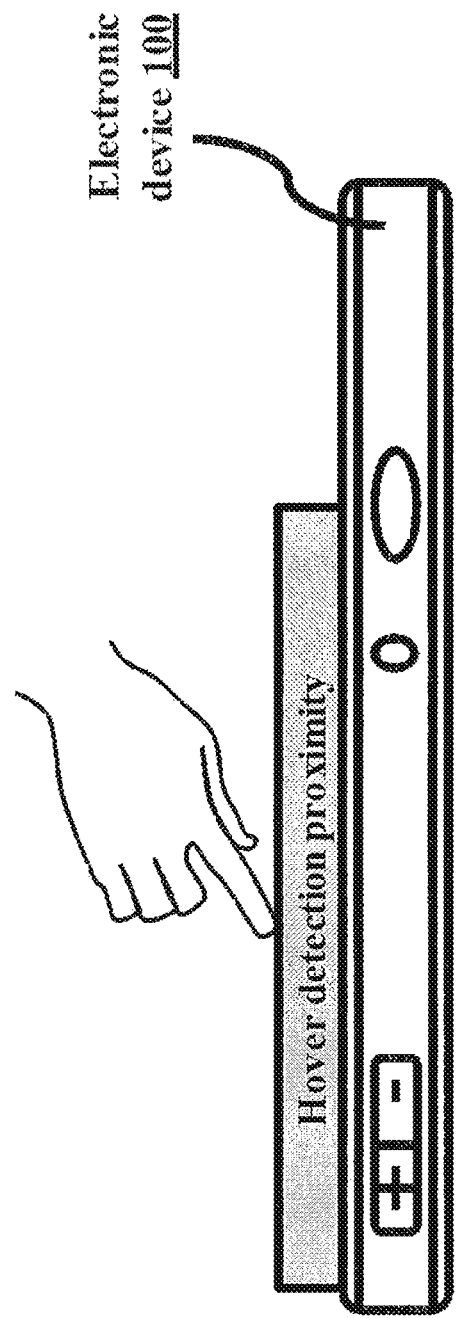
FIG. 1 illustrates a screenshot to activate quasi-states on an electronic device, according to embodiments disclosed herein.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system to implement a quasi-user interface to manage application switching by activating quasi-states on an electronic device. The method supports quasi-states, for managing the quasi-user interface on the electronic device, along with the existing non-quasi-states for application state transitions.

In an embodiment, the electronic device include but are not limited to mobile phones, laptops, tablets, personal computers, digital media players, electronic watch, or any other electronic device installed with applications.

In an embodiment, a quasi-state for an application supported on the electronic device can be a quasi-foreground state or a quasi-background state.

In an embodiment, a non-quasi-state for an application supported on the electronic device can be a foreground state, a background state and a visible state.

In an embodiment, a quasi-user interface is an interface supported on the electronic device that has a lifetime that is bound by the presence of an object, such as, for example, a finger, thumb, stylus, pen, etc., in the hover detection proximity. The interface is used to manage applications between the quasi-states and the non-quasi-states on the electronic device.

Referring now to the drawings, and more particularly to FIGS. 1 through 8, where similar reference characters denote corresponding features consistently throughout the figures, there are shown preferred embodiments.

FIG. 1 illustrates a screenshot to activate quasi-states on an electronic device, according to embodiments as disclosed herein. The electronic device 100 as depicted in the figure comprises of a notification bar. The notification bar supports a sensor that can detect external changes occurring within the proximity of the device sensor. For example, a sensor can detect a user-action performed within the proximity of the device, or thermal changes occurring within the proximity of the device.

In an embodiment, the user-action can be performing a gesture over the notification bar in the electronic device 100.

For example, as depicted in the figure, the user uses his/her finger over the notification bar of the device to activate the quasi-state and manage the quasi-user interface to support the quasi-states for the applications.

Figure 2:
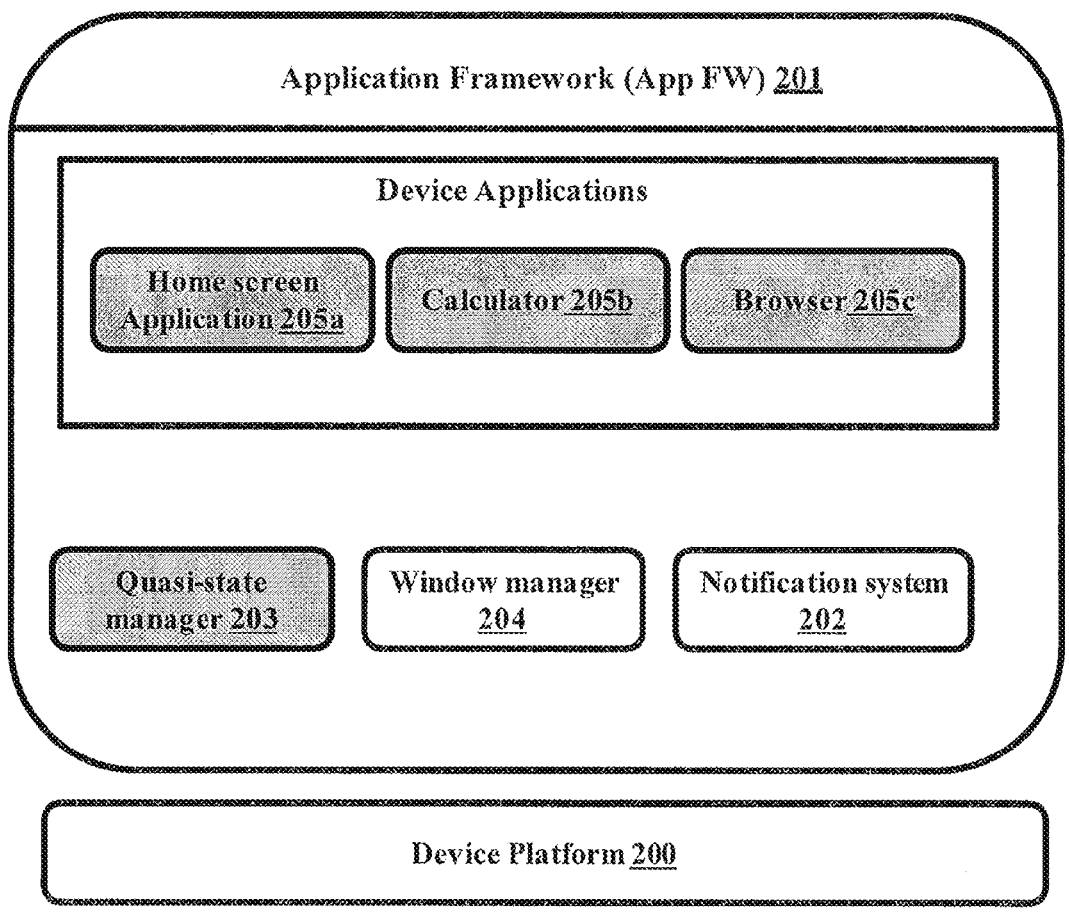
FIG. 2 illustrates an application framework with the implementation of quasi-states, according to the embodiments disclosed herein.

FIG. 2 illustrates an application framework with the implementation of quasi-states, according to embodiments as disclosed herein. As depicted in the figure, to implement the quasi-states, application framework 201 includes the, a quasi-state manager. Apart from this the application framework 201 comprises of different applications supported on the device 205a, 205b, and 205c. For example, the applications 205a can be a home screen application, 205b can be a calculator and 205c can be a Browser. Initially, the user performs the user-action within the proximity of the electronic device 100. As the notification system 202 senses the user-action on the electronic device 100, the quasi-state manager 203 activates the quasi-state for the applications supported on the electronic device 100. Further, the application framework 201 invokes the quasi-user interface on the electronic device 100 and informs the quasi-state manager 203 about the activation of quasi-user interface to manage the applications in the quasi-states. Further the application framework 201 allows the user to manage the application state transitions between the quasi-state and the non-quasi-state. As the quasi-states are activated by the quasi-state manager 202, the application framework 201 supports the quasi-state for the applications 205a, 205b, and 205c supported on the electronic device 100.

Figure 3:
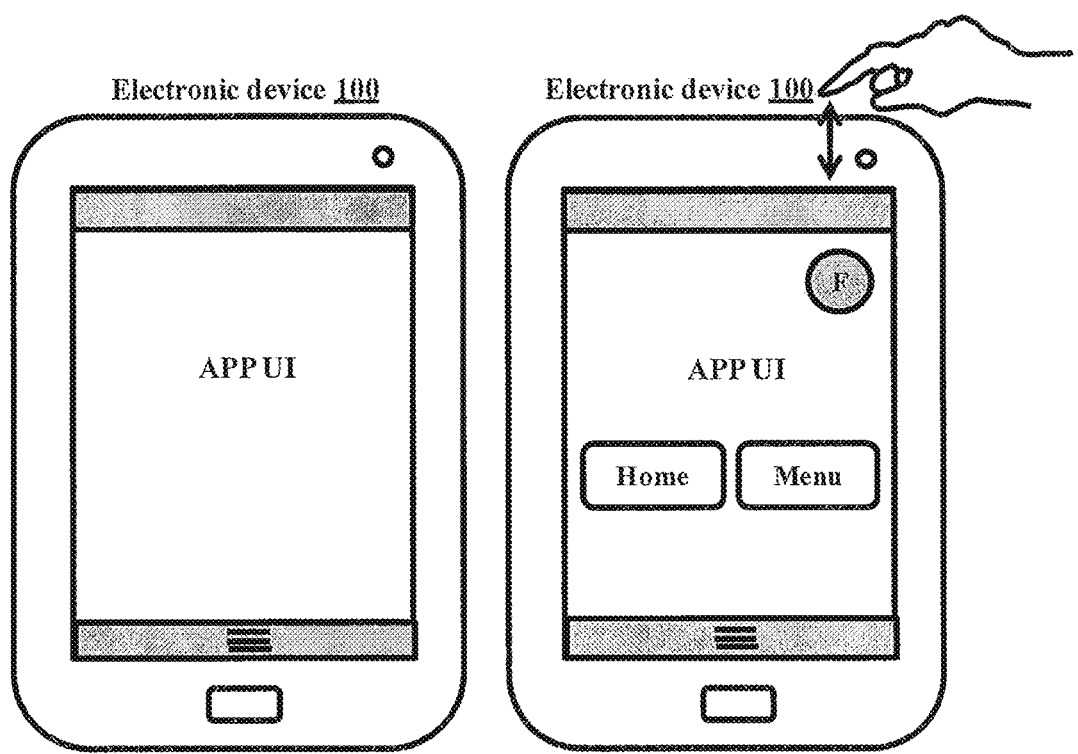
FIG. 3 illustrates a device access application launched on activating the quasi-states on the electronic device, according to embodiments disclosed herein.

FIG. 3 illustrates a device access application launched on activating the quasi-states on the electronic device, according to embodiments as disclosed herein. As depicted in the figure, when the user performs a user-action on the notification bar, such as a hovering gesture on a foreground application APP-UI, the quasi-state manager activates the quasi-state on the electronic device 100. Further, the application framework 201 launches a device access application on the electronic device 100.

In an embodiment, a device access application is a special application that can be launched only from another application context when the quasi-state is activated on the electronic device 100. Further, launching of the device access application activates the quasi-user interface for managing the applications supported on the electronic device 100.

In an embodiment, the quasi-user interface for an application is rendered on a transparent-window having an icon on the screen that allows the user to switch the application from the quasi-foreground to the actual foreground state. The device access application allows the user to navigate to the Home screen of the device using the Home button. The device access application invoked on the electronic device 100 from the APP-UI application is available in the quasi-foreground state, and the APP-UI application that was in foreground while invoking the quasi-user interface is moved to the quasi-background state.

Figure 4:
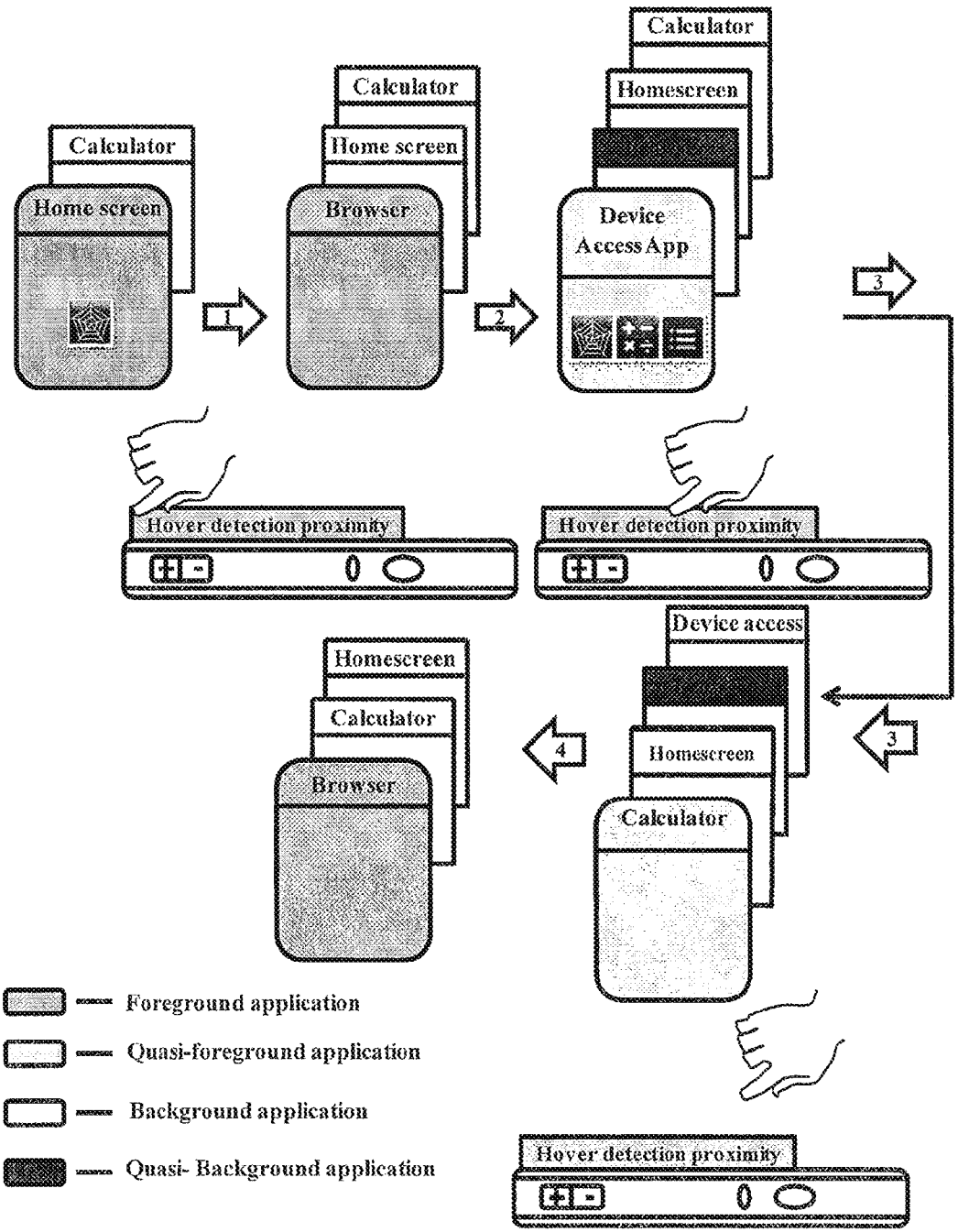
FIG. 4 illustrates managing the application states between a quasi-state and a non-quasi-state using the quasi-user interface, according to embodiments disclosed herein.

FIG. 4 illustrates managing the application states between the quasi-state and the non-quasi-state using the quasi-user interface, according to the embodiments as disclosed herein. As depicted in the figure, initially the user is allowed to select an application from the Home screen, and the Home screen is displayed in the foreground state when the electronic device 100 is turned on. The Browser application is opened from the Home screen and the Browser application moves to the foreground state. While the Browser application moves to the foreground state, the Home screen moves to the background state. Further, when the user performs a user-action on the notification bar of the device, the quasi-state is activated on the electronic device 100. As the quasi-state is activated, the application framework launches the device access application in the quasi-foreground state. As the device access application is moved to the quasi-foreground state, the Browser application moves to the quasi-background state. Further, launching of the device access application activates the quasi-user interface for managing the applications supported on the electronic device 100.

As the quasi-user interface is activated, the interface allows the user to select applications from the interface that are supported on the electronic device 100. Further, the quasi-user interface allows the user to perform any user-based activity on the quasi-foreground application, and the quasi-foreground application is maintained in the quasi-foreground state for a duration determined by presence of the object within the proximity of the electronic device. Further, when the user lifts the object away from the proximity of the electronic device 100, the quasi-state manager deactivates the activated quasi-state on the electronic device 100. While deactivating the quasi-state, the quasi-foreground application moves to the background state and the quasi-background application moves to the foreground state.

For example, initially the Home screen is displayed on the device and from the Home screen, the user selects a Browser application. Currently, the Browser application is displayed in the foreground state. While the Browser application is in foreground, the user performs a hovering gesture on the notification bar of the device to activate the quasi-state on the electronic device 100. As the quasi-state is activated, the device access application is launched and displayed in quasi-foreground and the browser in the foreground is moved to the quasi-background. Further, the device access application allows the user to navigate to various applications supported on the electronic device 100 in the quasi-states, and manages the application state transitions between the quasi-state and the non-quasi-state. In the current scenario, the user selects a calculator application from the device access application. Upon selecting the calculator application, the calculator application is moved to the quasi-foreground state and the device application is moved to the background state. The user can then interact with the calculator application keeping his/her finger within the proximity of the electronic device 100. Additionally, the user can deactivate the quasi-states for the applications supported on the electronic device 100 by lifting his/her finger away from the proximity of the electronic device 100. As the quasi-state is deactivated, the calculator application that is available in the quasi-foreground state moves to the background state and the browser application that is available in the quasi-background state moves to the foreground state.

Figure 5:
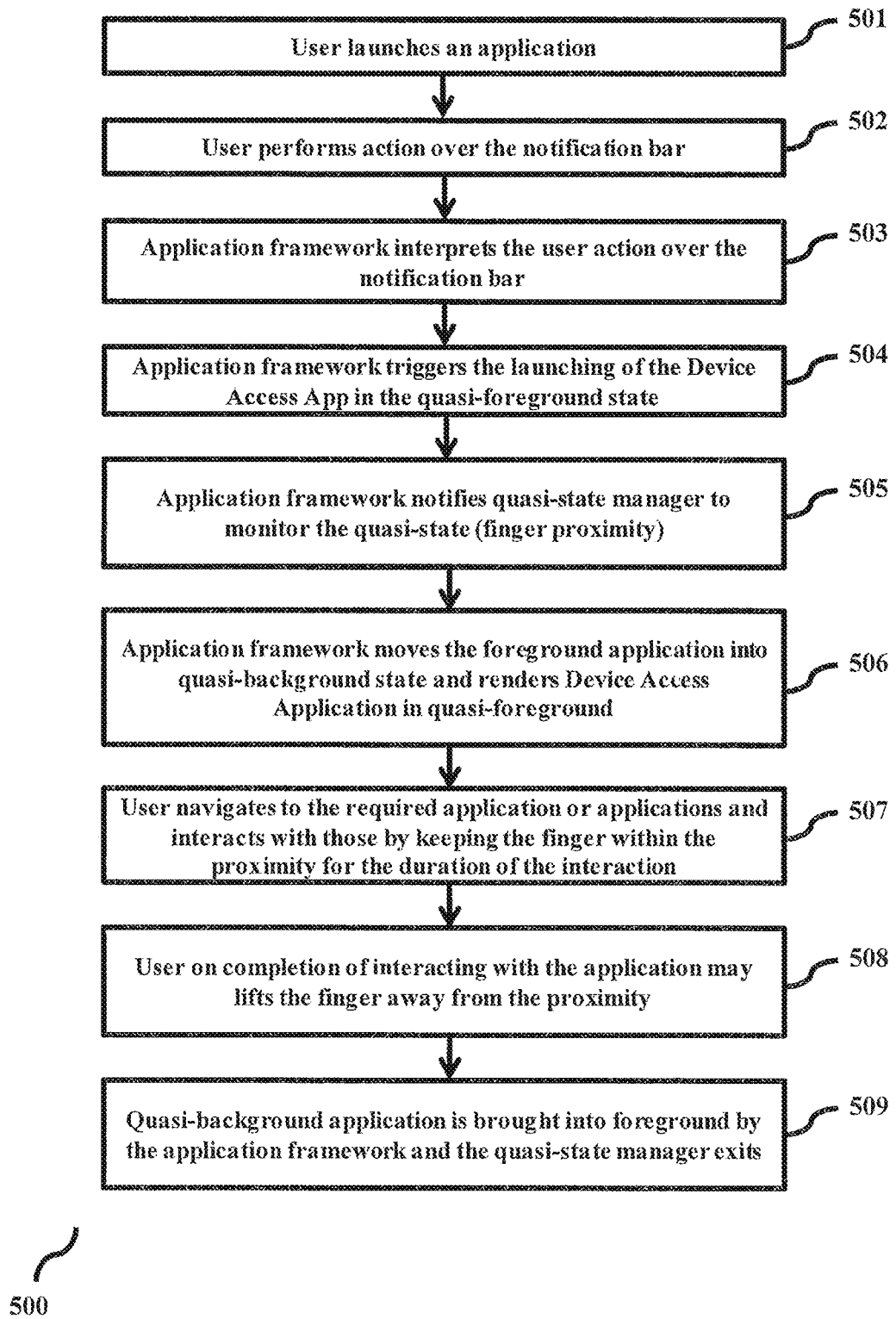
FIG. 5 illustrates the process of activating quasi-state transitions for applications and managing the quasi-user interface for the applications, according to the embodiments disclosed herein.

FIG. 5 illustrates the process of activating quasi-state transitions for applications and managing the quasi-user interface for the applications, according to embodiments as disclosed herein. Initially, the user launches (501) the application from a Home screen of the device. After launching the application on the device, the user performs (502) an action on the notification bar. The application framework 201 interprets (503) the user-action performed on the notification bar and triggers the launching of the device access application in the quasi-foreground state by notifying (504) the quasi-state manager. As the quasi-states are activated on the electronic device 100, the application framework 201 launches (504) the device access application in the quasi-foreground state. Further, the quasi-states remain activated until the user lifts his/her finger away from the proximity (508) of the electronic device 100. As the quasi-states are activated, the application framework 201 launches the device access application as a quasi-foreground application and moves (506) the foreground application to the quasi-background state. Further, the device access application allows (507) the user to navigate to the desired or required application or applications and allows the user to interact with the quasi-foreground application by keeping the object within the proximity for the duration of the interaction. Further, the quasi-state manager 203 monitors (508) the user-action within the proximity of the electronic device 100. If the quasi-state manager 203 recognizes the event of user-lifting his/her finger away from the proximity of the electronic device 100, the quasi-state manager 203 deactivates the quasi-state. Further, as the quasi-state manager 203 is deactivated (509) the quasi-foreground application moves to the background state and the quasi-background application moves to the foreground state. The various actions in flow diagram 500 may be performed in the order presented, in a different order or simultaneously. Further, in some embodiments, some actions listed in FIG. 5 may be omitted.

Figure 6:
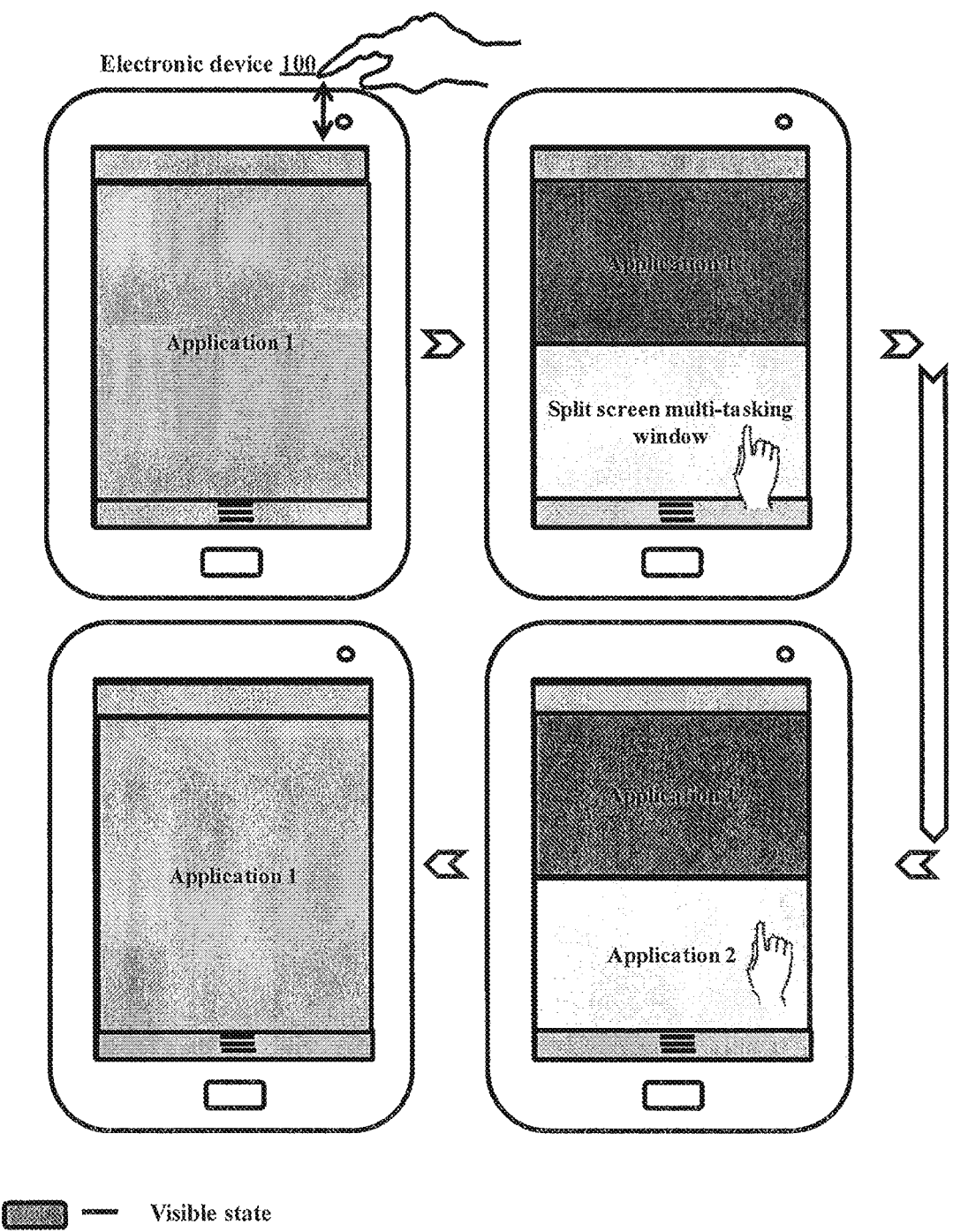
FIG. 6 illustrates an example method to access applications in the quasi-state in a split-screen multi-tasking window, according to the embodiments disclosed herein.

FIG. 6 illustrates an example method to access applications in the quasi-state in a split-screen multi-tasking window, according to embodiments as disclosed herein. As depicted in the figure, when the user-action is performed over the notification bar of the device that supports a split-screen multi-tasking window, the quasi-state manager activates the quasi-states for the application in the split-screen multi-tasking window. As the quasi-states are activated in the split-screen multi-tasking window, the quasi-user interface is invoked in the split-screen multi-tasking window. Further, the quasi-state activated application is maintained in the quasi-foreground state for the duration determined by presence of the object within the proximity of the electronic device 100. When the user lifts his finger away from the proximity of the electronic device 100, the quasi-state activated application moves to the background state and the application displayed in the visible state in the other split-screen multi-tasking window is displayed in a full-screen mode. For example, as shown in the figure, Application 2 is invoked in the quasi-foreground state in the split-screen multi-tasking window. The user can continue to access the Application 2 by performing user-actions keeping his/her finger within the proximity of the electronic device 100. Further, when the Application 2 is in the quasi-foreground state, Application 1 is displayed in the visible state. If the user lifts his/her finger away from the proximity of the electronic device 100, the Application 2 moves to the background state and the Application 1 moves to the foreground state and is displayed in the full-screen mode.

Figure 7:
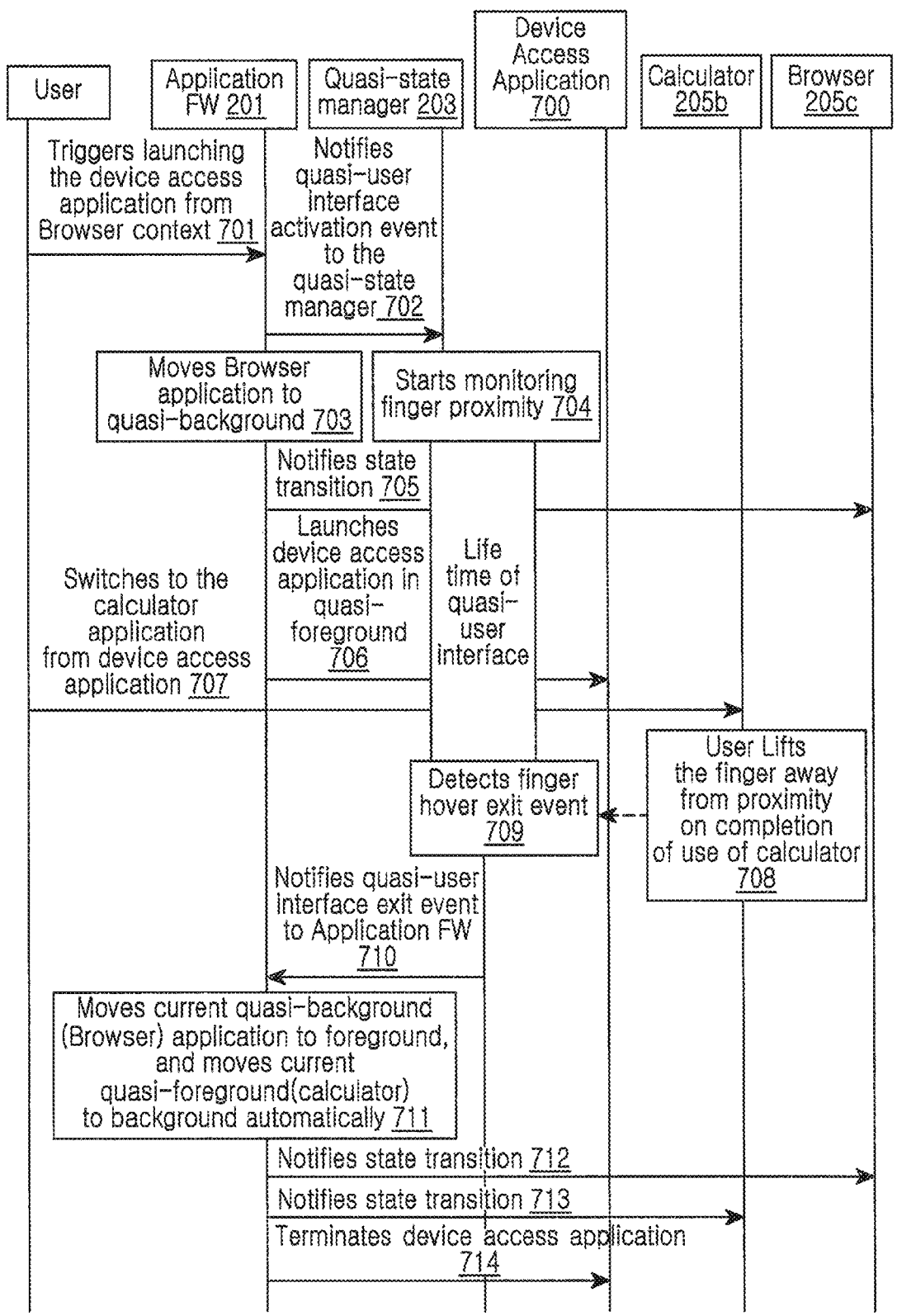
FIG. 7 illustrates a sequence diagram for the electronic device to activate quasi-states and manage state transitions between a quasi-state and a non-quasi-state, according to the embodiments disclosed herein.

FIG. 7 illustrates the sequence diagram for the electronic device to activate quasi-states and manage state transitions between a quasi-state and a non-quasi-state, according to embodiments as disclosed herein. Considering that the user loads a browser in the electronic device 100. As depicted in the figure, initially, the user performs the user-action on the notification bar of the electronic device 100 with the Browser application in the foreground state. The user-action activates (701) the quasi-state for the applications, and the device access application 700 is launched on the electronic device 100. Further, the application framework 201 notifies (702) the quasi-state manager 203 about the activation of the quasi-state. As the device access application 700 is launched on the electronic device 100, the quasi-user interface is activated as the quasi-foreground application. As the device access application 700 is launched in the quasi-foreground state, the browser application is moved (703) to the quasi-background state. Further, the quasi-state manager starts monitoring (704) the user-action performed on the quasi-foreground application. As the quasi-state manager starts monitoring the user-actions on the electronic device 100, the application framework notifies (705) the browser regarding the application state transitions monitored by the quasi-state manager 203 and launches (706) the device access application in the quasi-foreground state.

Further, if the user intends to access (707) another application (For example: to access calculator application 205*b*) displayed in the quasi-user interface (the device access application 700, the selected application 205*b* moves to the quasi-foreground state and the device access application 700 moves to the background state. Once the quasi-foreground state is activated for the application, it is maintained (708) in the same state for a duration determined by the presence of the object within the proximity of the electronic device 100. Now the user can interact with the quasi-foreground application by keeping his finger within the hover detection proximity. When the user lifts his/her finger away from the proximity of the electronic device 100 (709), the quasi-state is deactivated and the quasi-state manager notifies (710) the application framework 201 about the deactivation and the device access application 700 is terminated. As the quasi-states are deactivated for the applications, the quasi-foreground application (the calculator application 205*b*) is moved (711) to the background state and the quasi-background application (the browser application 205*c*) is moved to the foreground state. For example, the quasi-state manager checks if the user is performing actions keeping his/her finger within the proximity of the device on the quasi-foreground application (the calculator application 205*b*). If the user lifts the object away from the proximity, the quasi-state manager moves the quasi-foreground application (the calculator application 205*b*) to the background state and the quasi-background application (the browser application 205*c*) is moved to the foreground state. Further, the application framework 201 notifies (712), (713) the state transitions to the foreground (the browser application 205*c*) and the background (the calculator 205*b*) applications on the electronic device 100. The application framework 201 notifies (714) the quasi-user interface (the Home screen application 700) about the interface exit status on the electronic device 100. The various actions in as depicted in FIG. 7 may be performed in the order presented, in a different order or simultaneously. Further, in some embodiments, some actions listed in FIG. 7 may be omitted.

Figure 8:
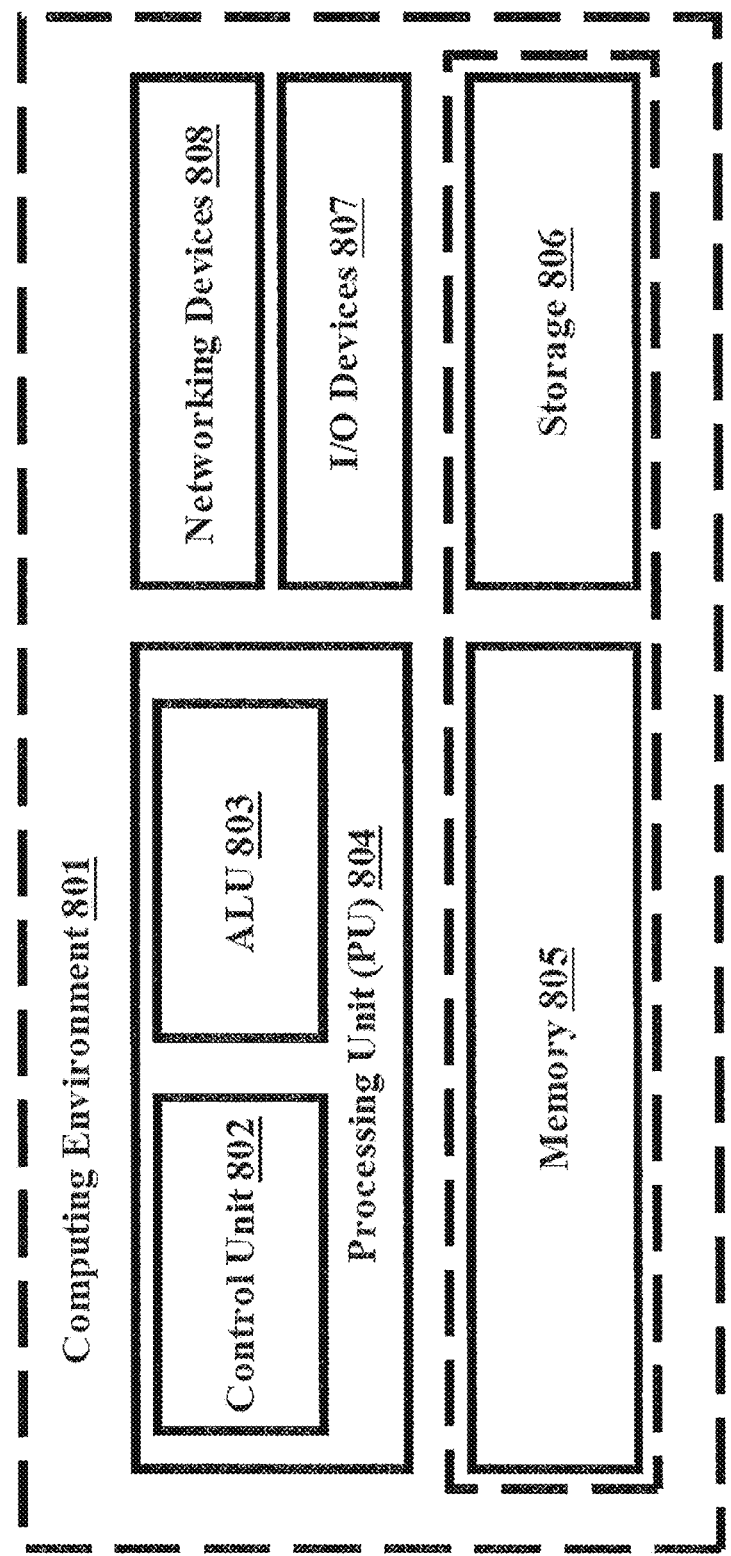
FIG. 8 illustrates a computing environment implementing the method to handle application state transitions in the electronic device by implementing quasi-state transitions and managing the quasi-user interface, according to embodiments disclosed herein.

FIG. 8 illustrates a computing environment implementing the quasi-user interface to manage application state transitions in the electronic device by activating the quasi-state transitions and managing the quasi-user interface, according to embodiments as disclosed herein. As depicted the computing environment 801 comprises at least one processing unit 804 that is equipped with a control unit 802 and an Arithmetic Logic Unit (ALU) 803, a memory 805, a storage unit 806, plurality of networking devices 808 and a plurality Input output (I/O) devices 807. The processing unit 804 is responsible for processing the instructions of the algorithm. The processing unit 804 receives commands from the control unit in order to perform processing. Further, any logical and arithmetic operations involved in the execution of the instructions are computed with the help of the ALU 803.

The overall computing environment 801 can be composed of multiple homogeneous and/or heterogeneous cores, multiple CPUs of different kinds, special media and other accelerators. The processing unit 804 is responsible for processing the instructions of the algorithm. Further, the plurality of processing units 804 may be located on a single chip or over multiple chips.

The algorithm comprising of instructions and codes used for the implementation are stored in either the memory unit 805 or the storage 806 or both. At the time of execution, the instructions may be fetched from the corresponding memory 805 and/or storage 806, and executed by the processing unit 804.

In case of any hardware implementations various networking devices 808 or external I/O devices 807 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2, 3, 4, 6, and 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method to implement a quasi-user interface for at least one application on an electronic device, the method comprising:
   activating a quasi-state in response to detecting a user-action performed on said electronic device, wherein said quasi-state is maintained for a duration determined based on a presence of an object within proximity of a display of said electronic device;
   in response to activating of said quasi-state, switching a foreground state of a first application to a quasi-background state, and displaying a device access application in a quasi-foreground state;
   in response to selection of a second application via said device access application, switching said quasi-foreground state of said device access application to a background state and displaying said second application to said quasi-foreground state;
   deactivating said quasi-state when the object is lifted away from said proximity of said display; and
   in response to deactivating of said quasi-state, switching said quasi-background state of said first application to said foreground state and switching said quasi-foreground state of said second application to said background state.

2. The method as in claim 1, further comprising invoking said quasi-user interface for an application of said electronic device when said quasi-state is activated.

3. The method as in claim 1, wherein said user-action comprises a gesture performed over an application user interface of said electronic device.

4. An apparatus configured to implement a quasi-user interface for at least one application on an electronic device, the apparatus comprising:
   an integrated circuit further comprising at least one processor;
   at least one memory comprising computer program code;
   wherein the at least one processor is configured to execute the program code to cause the apparatus to:
      activate a quasi-state in response to detecting a user-action performed on said electronic device, wherein said quasi-state is maintained for a duration determined based on a presence of an object within proximity of a display of said electronic device;
      in response to activating of said quasi-state, switch a foreground state of a first application to a quasi-background state, and display a device access application in a quasi-foreground state;
      in response to selection of a second application via said device access application, switch said quasi-foreground state of said device access application to a background state and display said second application to said quasi-foreground state;
      deactivate said quasi-state when the object is lifted away from said proximity of said display; and
      in response to deactivating of said quasi-state, switch said quasi-background state of said first application to said foreground state and switch said quasi-foreground state of said second application to said background state.

5. The apparatus as in claim 4, wherein the at least one processor is further configured to execute the program code to cause the apparatus to invoke said quasi-user interface for an application of said electronic device when said quasi-state is activated.

6. The apparatus as in claim 4, wherein said user-action comprises a gesture performed over an application user interface of said electronic device.

7. A non-transitory computer readable medium comprising program code that, when executed by at least one processor, causes an electronic device to:
   activate a quasi-state in response to detecting a user-action performed on said electronic device, wherein said quasi-state is maintained for a duration determined based on a presence of an object within proximity of a display of said electronic device;
   in response to activating of said quasi-state, switch a foreground state of a first application to a quasi-background state, and display a device access application in a quasi-foreground state;
   in response to selection of a second application via said device access application, switch said quasi-foreground state of said device access application to a background state and display said second application to said quasi-foreground state;
   deactivate said quasi-state when the object is lifted away from said proximity of said display; and
   in response to deactivating of said quasi-state, switch said quasi-background state of said first application to said foreground state and switch said quasi-foreground state of said second application to said background state.

8. The non-transitory computer readable medium as in claim 7, further comprising program code that, when executed by the at least one processor, causes the electronic device to invoke a quasi-user interface for an application of said electronic device when said quasi-state is activated.

9. The non-transitory computer readable medium as in claim 7, wherein said user-action comprises a gesture performed over an application user interface of said electronic device.

* * * * *